US012798882B2

(12) United States Patent
Tomblin et al.

(10) Patent No.: US 12,798,882 B2
(45) Date of Patent: Nov. 17, 2026

(54) CONVEYOR SYSTEM, BELT TURN OVER SYSTEM AND DIRECTING ASSEMBLY THEREFOR, AND ASSOCIATED METHOD OF TURNING OVER A CONVEYOR BELT

(71) Applicant: Stahura Conveyor Products, Inc., Lewisville, NC (US)

(72) Inventors: Rickey Tomblin, Chapmanville, WV (US); Andrew J. Stahura, III, Butler, PA (US)

(73) Assignee: Stahura Conveyor Products, Inc., Lewisville, NC (US)

( * ) Notice: Subject to any disclaimer, the term of this patent is extended or adjusted under 35 U.S.C. 154(b) by 111 days.

(21) Appl. No.: 19/055,073

(22) Filed: Feb. 17, 2025

(65) Prior Publication Data

US 2025/0263240 A1 Aug. 21, 2025

Related U.S. Application Data

(60) Provisional application No. 63/555,116, filed on Feb. 19, 2024.

(51) Int. Cl.
*B65G 15/64* (2006.01)

(52) U.S. Cl.
CPC .......... *B65G 15/64* (2013.01); *B65G 2207/48* (2013.01); *B65G 2812/02168* (2013.01)

(58) Field of Classification Search
CPC ................ B65G 15/64; B65G 2207/48; B65G 2812/02168
USPC ...................................... 198/618, 860.1, 835
See application file for complete search history.

(56) References Cited

U.S. PATENT DOCUMENTS 3,701,522 A * 10/1972 Chi ........................ B65H 45/20
493/399
6,640,965 B2 * 11/2003 Trieb ..................... B65G 15/60
198/839

OTHER PUBLICATIONS

CN121778365 (Year: 2026).*

* cited by examiner

*Primary Examiner* — Gene O Crawford
*Assistant Examiner* — Lester Rushin, III
(74) *Attorney, Agent, or Firm* — The Powers IP Law Firm

(57) ABSTRACT

A directing assembly of a belt turn over system is for use in a conveyor system. The conveyor system includes a conveyor belt and a plurality of support members. The conveyor belt is configured to move from a first location of the conveyor system to a second location thereof. The directing assembly includes a channel member structured to be coupled to at least one of the plurality of support members, and a plurality of directing members each removably coupled to the channel member and configured to be in a static state with respect to the channel member when the conveyor belt moves from the first location to the second location. The directing members are configured to engage the conveyor belt as the conveyor belt moves from the first location to the second location in order to turn over the conveyor belt.

19 Claims, 11 Drawing Sheets

CONVEYOR SYSTEM, BELT TURN OVER SYSTEM AND DIRECTING ASSEMBLY THEREFOR, AND ASSOCIATED METHOD OF TURNING OVER A CONVEYOR BELT

CROSS REFERENCE TO RELATED APPLICATION

This application claims priority to and claims the benefit of U.S. Provisional Patent Application Ser. No. 63/555,116, filed Feb. 19, 2024, the contents of which are incorporated herein by reference in their entirety.

BACKGROUND

For over one hundred years, conveyor systems have been a reliable and economical way to move ore, coal, and large numbers of other materials. As a result, conveyor systems are at the core of a large number of operations. However, known conveyor systems have a number of drawbacks. For example, a portion of one prior art conveyor system 2 is shown in FIG. 1A. As shown, the system 2 employs a number of bend pulleys 10,12 along the length of a conveyor belt 4, and also employs a number of bearings 20,22 for each of the bend pulleys 10,12. This assembly is often employed to turn over the conveyor belt 4 in operation, and commonly takes significant force in order to maneuver the conveyor belt 4. Furthermore, this setup is undesirably configured such that the pressure distribution on the length of the bend pulleys 10,12 tends to cause uneven wear on the bend pulleys 10,12. As a result, this causes premature replacement and significant costs (e.g., due to down time) to be incurred to remove and replace what is a very large and heavy piece of equipment. For example, such equipment tends to be in difficult to get to locations, in terms of geography, structural complexities, and custom mounting requirements per installation. The adverse pressure associated with the bend pulleys 10,12 along the length of the conveyor belt 4 also has an impact on the life of the bearings 20,22, which causes the same problems as mentioned above.

It is with respect to these and other considerations that the instant disclosure is concerned.

SUMMARY

As one aspect of the disclosed, a directing assembly of a belt turn over system is for use in a conveyor system. The conveyor system includes a conveyor belt and a plurality of support members. The conveyor belt is configured to move from a first location of the conveyor system to a second location thereof. The directing assembly includes a channel member structured to be coupled to at least one of the plurality of support members, and a plurality of directing members each removably coupled to the channel member and configured to be in a static state with respect to the channel member when the conveyor belt moves from the first location to the second location. The directing members are configured to engage the conveyor belt as the conveyor belt moves from the first location to the second location in order to turn over the conveyor belt.

As another aspect, a belt turn over system including the aforementioned directing assembly is provided.

As yet another aspect of the disclosed concept, a conveyor system including the aforementioned belt turn over system is provided.

As a further aspect of the disclosed concept, a method of turning over a conveyor belt with the aforementioned belt turn over system is provided.

DETAILED DESCRIPTION

Figure 1A:
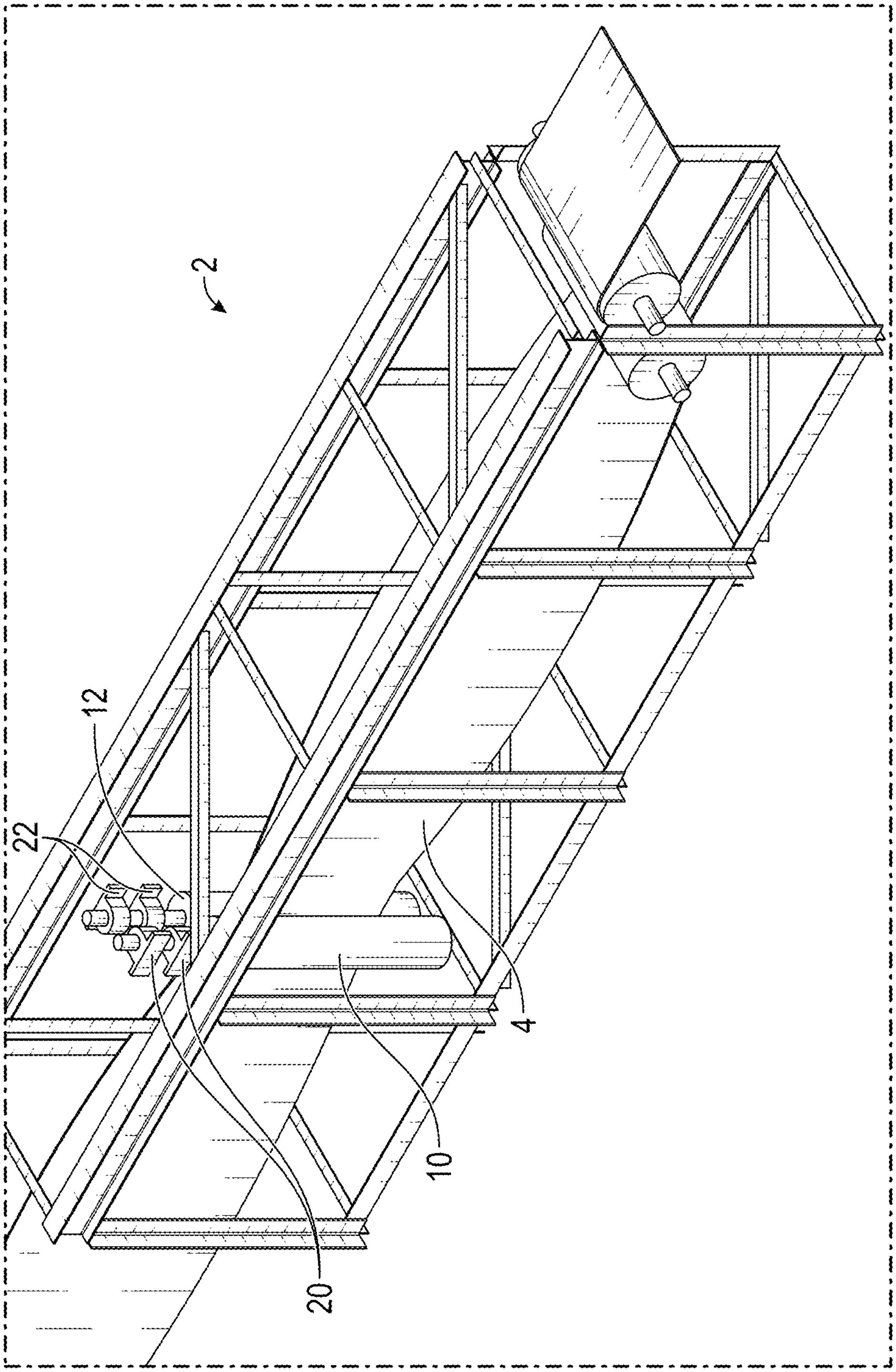
FIG. 1A (Prior Art)
FIG. 1A is an isometric view of a portion of a prior art conveyor system.

As employed herein, the term "system" shall mean a single assembly or multiple assemblies configured to be connected together via intermediate components, such as support members of a conveyor system.

As employed herein, the term "coupled" shall mean connected together either directly or via one or more intermediate parts or components.

As employed herein, the term "coupling member" shall mean a wide variety of fastening mechanisms, including without limitation, bolts, nuts, screws, rivets, pull pins, zip ties, and the like.

As employed herein, the term "number" shall mean one or an integer greater than one (i.e., a plurality).

As employed herein, an "exiting position" with respect to a pair of bend pulleys shall mean an orientation of a conveyor belt as the conveyor belt is initially passing beyond engagement with the bend pulleys.

FIGS. 1B-4 show various views of a portion of a conveyor system 102, shown as employed with a portion of a conveyor belt 104, in accordance with one non-limiting embodiment of the disclosed concept. It will be appreciated that the portion depicted in FIGS. 1B-4 may be near the head end of the conveyor system 102, such that a corresponding tail end (not shown) of the conveyor system 102 may be similarly structured, e.g., include a belt turn over system the same as or substantially the same as that discussed below in association with the head end of the conveyor system 102. The conveyor system 102 includes a number of support members 110,112,114,116,118,120 which cooperatively define a conveyor truss, as well as a pair of bend pulleys 130,132 each coupled to a corresponding pair of the support members 118,120. For example, the first, second, third, and fourth support members 110,112,114,116 are each oriented parallel to one another, and the fifth and sixth support members 118,120 are each oriented perpendicular to each of the first, second, third, and fourth support members 110,112,114,116.

Additionally, as shown, the conveyor system 102 further includes a belt turn over system 200 (see also FIGS. 5A and 5B, for a detailed view) configured to turn or flip the conveyor belt 104 from a first orientation (e.g., right side up) to a second orientation (e.g., upside down) as the conveyor belt 104 moves from a first location of the conveyor system 102 to a second location thereof (e.g., wherein the first and second locations are ends of the conveyor truss defined by the support members 110,112,114,116,118,120). As such, it will be appreciated that the conveyor belt 104 may enter the portion of the conveyor system 102 in the first orientation, be turned by the belt turn over system 200, and exit the portion of the conveyor system 102 via one of the bend pulleys 130,132, before passing to another portion (not shown for ease of illustration) of the conveyor system 102. Accordingly, the bend pulleys 130,132 direct the conveyor belt 104 after the conveyor belt 104 has been turned over by the belt turn over system 200.

The belt turn over system 200, which may be employed as a static system (e.g., no moving parts in operation), will now be discussed in association with the exploded isometric views of FIG. 5A and FIG. 5B. It will be appreciated in view of the following disclosure that the belt turn over system 200 advantageously allows for individual portions to be removed and quickly replaced, as opposed to today's arrangements in which entire bend pulleys (e.g., the bend pulleys 10,12 in the prior art arrangement of FIG. 1A) and associated bearings (e.g., the corresponding bearings 20,22) need to be replaced due to uneven wear. By allowing for a directing assembly belt turn over system 200, localized areas which have been worn can be quickly and easily replaced.

Figure 5A:
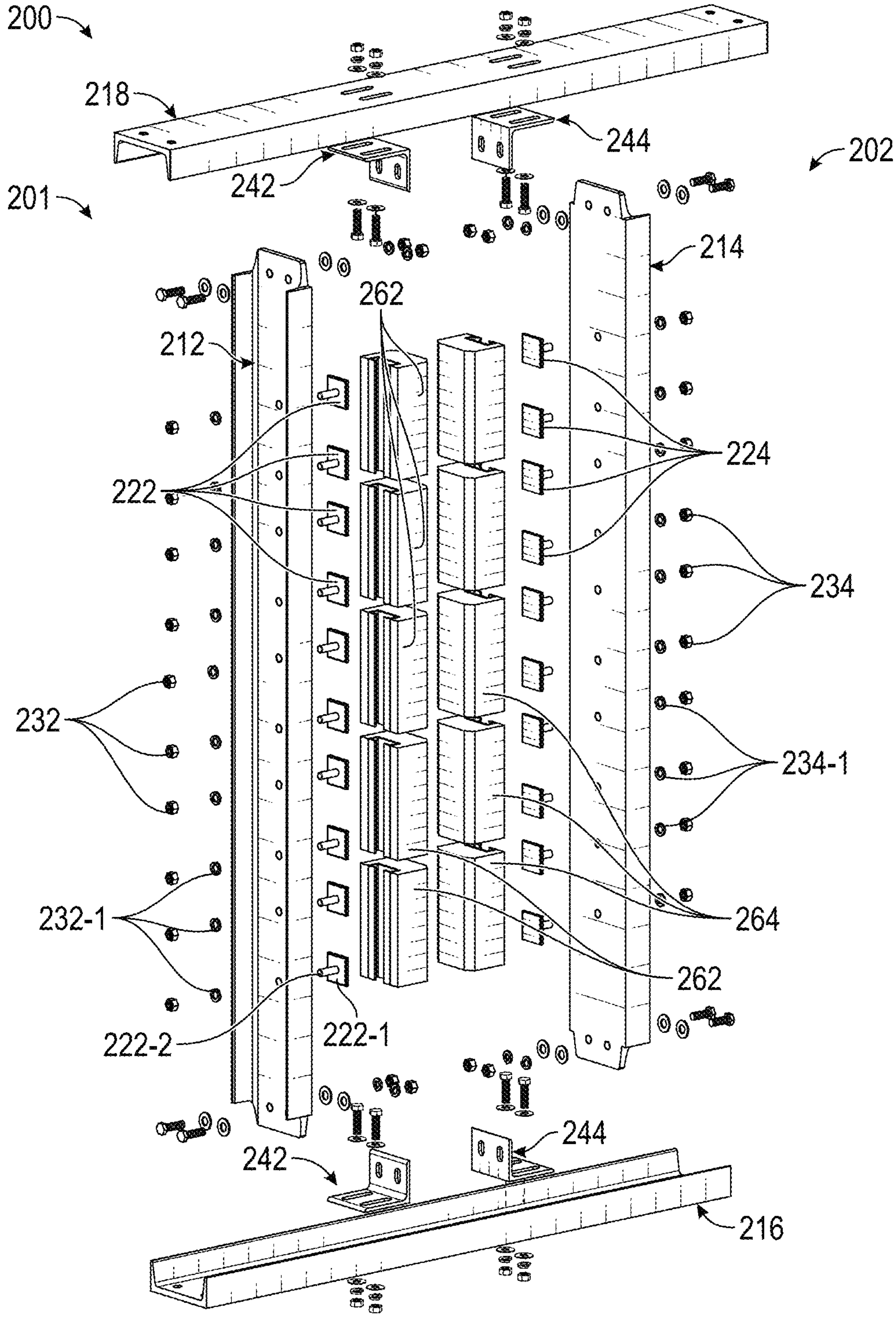
FIGS. 5A and 5B are exploded isometric and exploded front views, respectively, of a belt turn over system for the conveyor system of FIG. 1B.
Figure 5B:
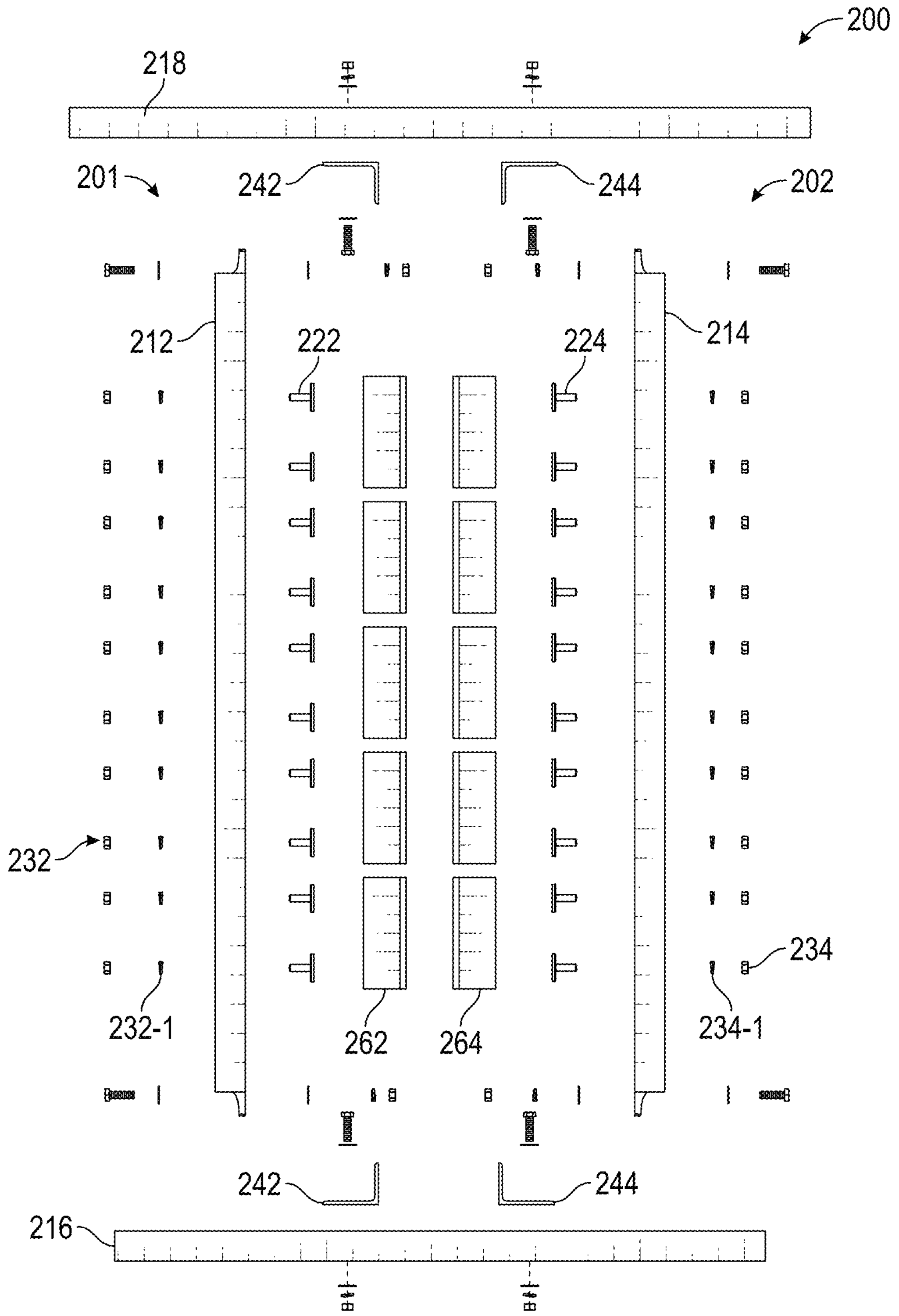

As shown in FIG. 5A, the example belt turn over system 200 includes a plurality of elongated channel members 212,214,216,218 each structured to be coupled to at least one of the plurality of support members 110,112,114,116,118,120. The first and second channel members 212,214 are oriented parallel to and spaced from one another in order to allow the conveyor belt 104 to properly pass therebetween. Moreover, the belt turn over system 200 further includes a plurality of maintaining members (only four of the maintaining members 222,224 are indicated on each side of the belt turn over system 200, for ease of illustration and economy of disclosure), a plurality of coupling members (e.g., only a few coupling members in the form of nuts 232,234 and washers 232-1,234-1 are indicated on each side of the belt turn over system 200), and a plurality of brackets 242,244 and a corresponding other plurality of coupling members (shown but not labeled) for coupling the channel members 212,214,216,218 together.

For example, the top brackets 242,244 preferably couple top portions of the vertical channel members 212,214 to the top channel member 218 (e.g., via coupling members), and the bottom brackets 242,244 preferably couple bottom portions of the vertical channel members 212,214 to the bottom channel member 216, such that in operation there is zero and/or de minimis vibration between these components. Moreover, the bottom channel member 216 preferably extends from the third support member 114 (FIG. 1B) to the fourth support member 116 (FIG. 1B), and the top channel member 218 preferably extends from the first support member 110 (FIG. 1B) to the second support member 112 (FIG. 1B).

Figure 1B:
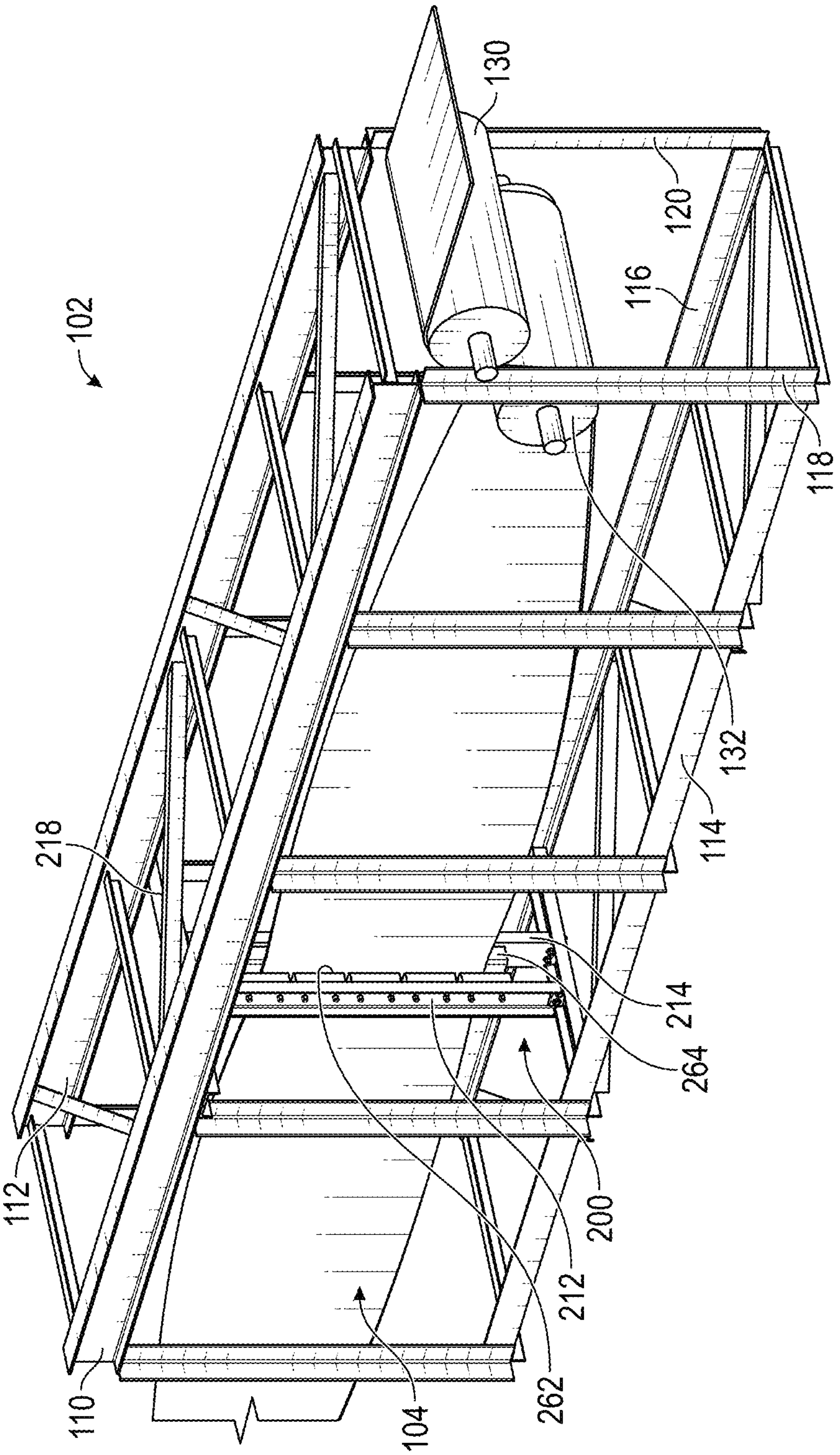
FIG. 1B is an isometric view of a portion of a conveyor system, in accordance with one non-limiting embodiment of the disclosed concept.
Figure 2:
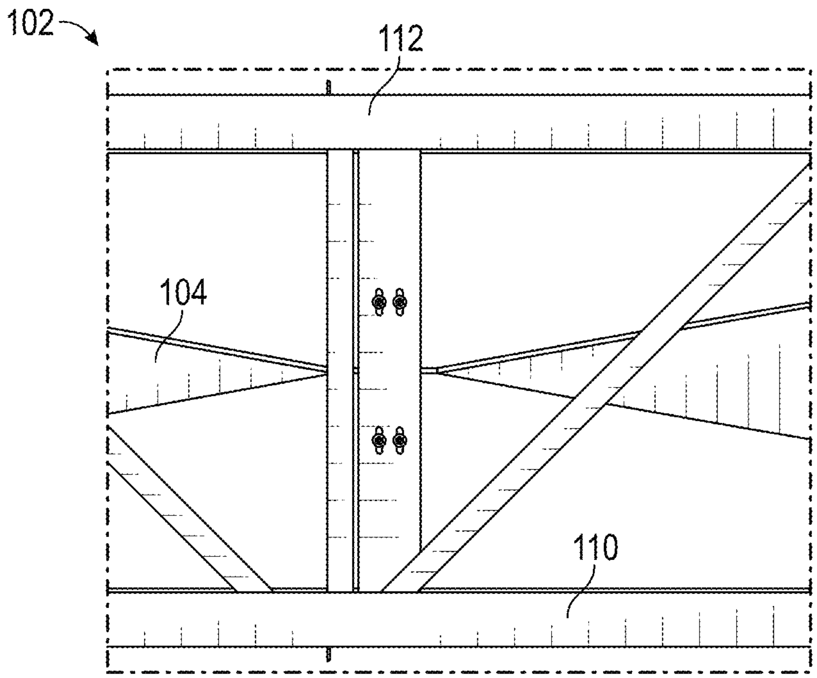
FIGS. 2-4 are top, front, and side views, respectively, of portions of the conveyor system of FIG. 1B.
Figure 3:
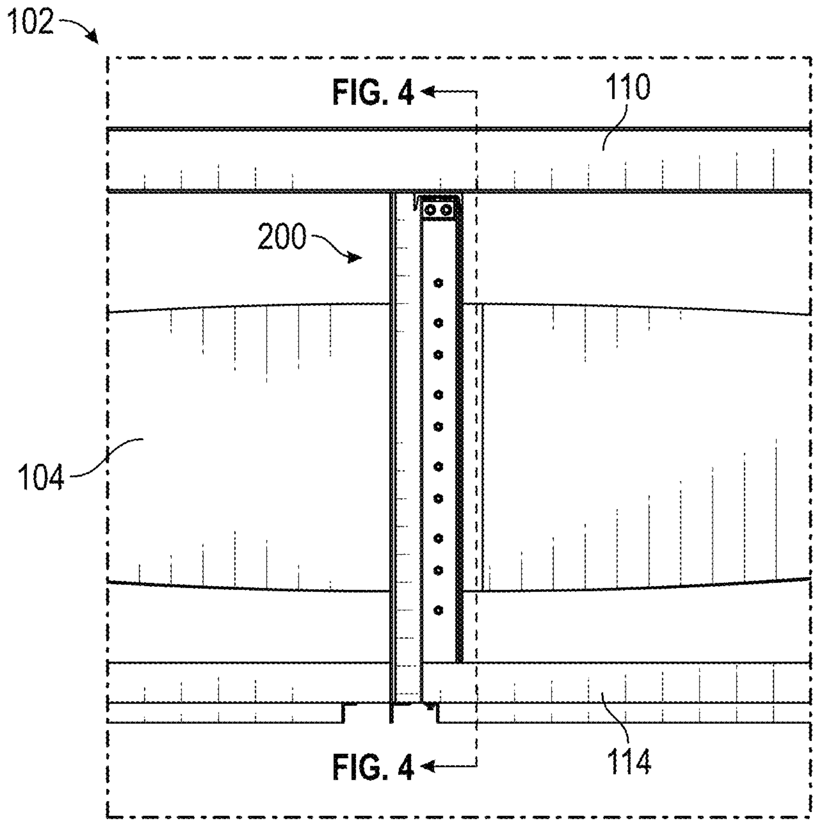
Figure 4:
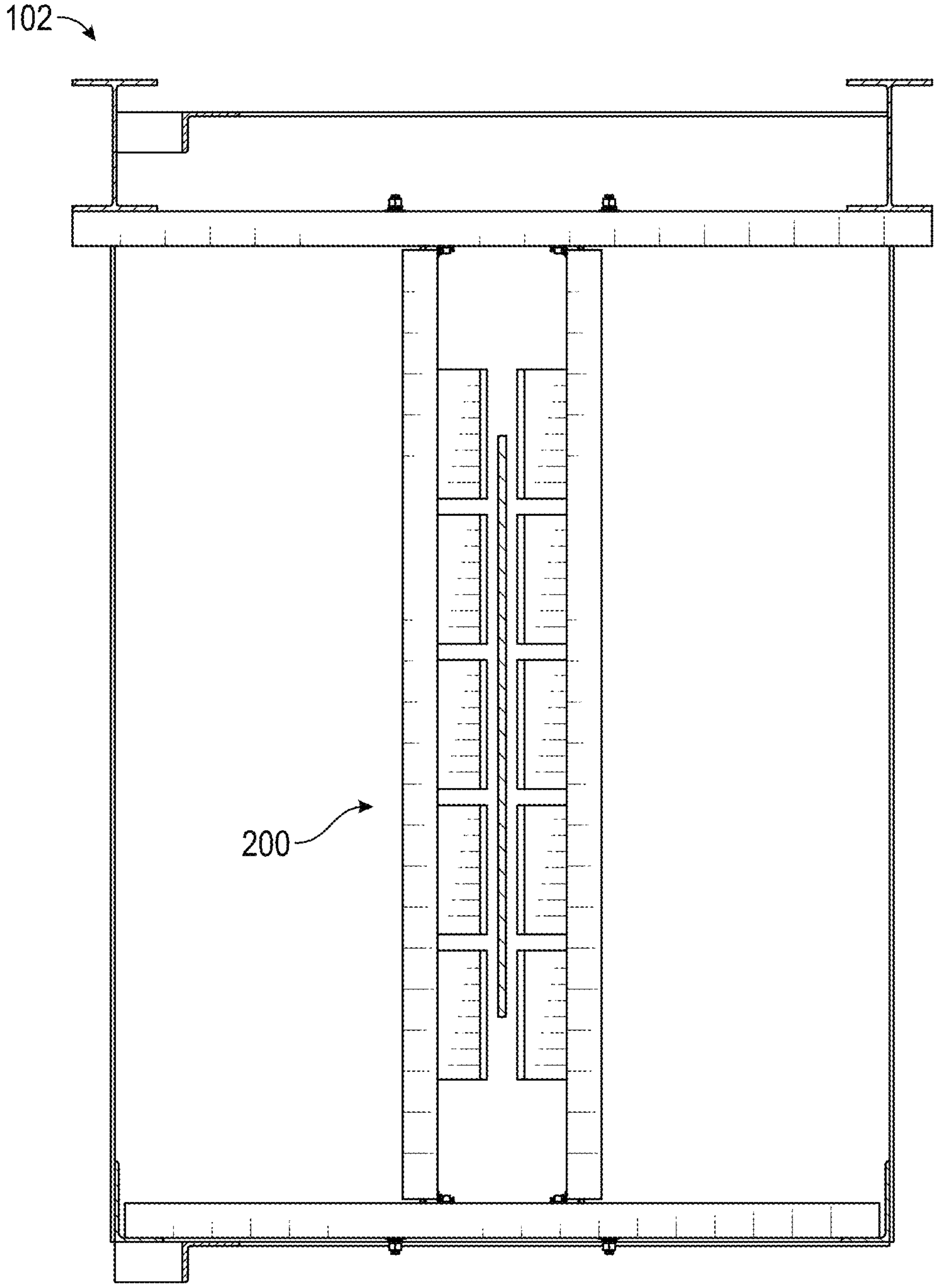

Additionally, as shown in FIG. 1B, in one example the top channel member 218 extends across and is coupled to the top support members 110,112 of the portion of the conveyor system 102, and the bottom channel member 216 extends across and is coupled to the bottom support members 114,116, in order to position the belt turn over system 200 within the portion of the conveyor system 102. Put differently, the bottom and top channel members 216,218 are each coupled to and oriented perpendicular with respect to the first and second channel members 212,214, and are configured to be oriented perpendicular to the conveyor belt 104 when the conveyor belt 104 is received between the channel members 212,214 (e.g., and also directing members 262,264, discussed below).

Referring again to FIG. 5A, in accordance with one non-limiting embodiment of the disclosed concept, the belt turn over system 200 further includes a plurality of directing members 262,264. The directing members 262,264 may be made of polycarbonate materials, poly-slide with fiberglass, monomeric and/or polymeric materials, urethane materials, ceramic materials, and metallic materials. The directing members 262,264, as shown in FIG. 5A, may include planar engaging faces with rounded corners for engaging the conveyor belt 104.

In one example, the directing members 262,264 are removably coupled to the channel members 212,214 and are configured to receive the conveyor belt 104 therebetween and turn over the conveyor belt 104 as the conveyor belt 104 moves from the first location to the second location (e.g., ends of the conveyor truss). Thus, when the conveyor belt 104 is located between the directing members 262,264, the conveyor belt 104 is in a first orientation, and when the conveyor belt 104 is in an exiting position with respect to the bend pulleys 130,132, the conveyor belt 104 is in a second orientation perpendicular to the first orientation.

Moreover, responsive to the conveyor belt 104 moving from the first to second location (e.g., ends of the conveyor truss), the directing members 262,264 are each in a static state (e.g., they do not move) with respect to the plurality of channel members 212,214,216,218. Furthermore, the removable coupling is preferably facilitated via the maintaining members 222,224 and the coupling members 232,234. For example, the maintaining members 222,224 preferably each include a base portion (one rectangular-shaped base portion 222-1 is labeled in FIG. 5A) and a stem portion (one stem portion 222-2 is labeled in FIG. 5A) extending outwardly therefrom (e.g., perpendicularly therefrom). In one example, the stem portion 222-2 may extend through the channel member 212 and be secured thereto via the coupling members 232,232-1 that are coupled to the stem portion 222-2. This securement may be in a threaded manner. Additionally, the maintaining members 224 are configured to likewise be secured to the channel member 214 via the coupling members 234,234-1 coupled to corresponding stem portions on outside portions of the channel member 214. Moreover, as shown in FIGS. 5A and 5B, the coupling members 232,232-1 and the base portions 222 are located on opposing sides of the first channel member 212, and the coupling members and base portions associated with the second directing members are located on opposing sides of the second channel member 214.

With the stem portions 222-2 loosely coupled to the coupling members 232,234 and extending through the channel members 212,214, the directing members 262,264, which are configured to receive and direct the conveyor belt 104 (FIG. 1B) can be positioned on the base portions 222-1. That is, the directing members 262,264 may each have, in one example, a partially C-shaped cross section which is configured to receive the stem portions 222-2, but have a narrow enough opening that the base portions 222-1 of the maintaining members 222,224 are reliably maintaining therein. Accordingly, once the directing members 262,264 are provided with the base portions 222-1 in an interior manner (e.g., within ends of the C-shaped cross section), subsequent tightening of the coupling members 232,232-1, 234,234-1 pulls the directing members 262,264 toward the channel members 212,214. Additionally, as shown in FIG. 5A, it will be appreciated that the belt turn over system 200 is advantageously provided with two of the maintaining members 222,224 for each one of the directing members 262,264, thereby allowing increased stability of the directing members 262,264 during operation. However, suitable alternative belt turn over system configurations are contemplated (e.g., a single larger maintaining member being provided for each one of the directing members 262,264).

In this manner, the belt turn over system 200 is configured to reliably turn or flip the conveyor belt 104 (FIG. 1B). That is, the conveyor belt 104 can pass between and be directed by the directing members 262,264. See, for example, FIG. 1B which shows the conveyor belt 104 being passed between the directing members 262,264, before being straightened out by either of the bend pulleys 130,132. In accordance with one advantageous aspect of the disclosed concept, the belt turn over system 200, unlike known assemblies (e.g., the system 2 in FIG. 1A) which commonly rely on bend pulleys to turn a conveyor belt, is configured to provide a number of advantages to users.

For example, as stated above, the directing members 262,264 are preferably removably coupled to the channel members 212,214 via the coupling members 232,234 and the maintaining members 222,224. As a result, if during operation of the conveyor system 102 (FIG. 1B), a user notices that any one of the plurality of directing members 262,264 is worn out from engagement with the conveyor belt 104 or another conveyor belt, the user need not spend large amounts of capital and time to replace the entire belt turn over system 200. Rather, all the user need do is remove the individual one of the directing members 262,264 which is worn out, and re-couple another new directing member. This may be done by loosening the coupling members 232,234, which may be nuts, and/or by pulling a pin (not shown).

Compare this with known assemblies which employ bend pulleys, wherein the entire bend pulley, e.g., bend pulleys 10,12 in FIG. 1A, and/or associated bearings, e.g., bearings 20,22 in FIG. 1A, typically needs to be replaced from the uneven wear, a situation which typically requires large numbers of hours, cranes, and multiple men to perform such a job. Put another way, the disclosed belt turn over system 200 is uniquely tailored for scenarios in which uneven wear due to a conveyor belt might result, specifically because that uneven wear can be accommodated by simply replacing the directing member of the system that is most worn out (e.g., not an entire bend pulley and associated bearings). This process of replacing a single directing member 262,264 can be done relatively easily when the conveyor system 102 (FIG. 1B) is shut down and locked out via less than 15 minutes of labor by a single person. Furthermore, the cost of replacing the individual directing member 262,264 is a small fraction of the costs associated with replacing a bend pulley under the same wear pattern.

Although the disclosed concept has been described in association with the belt turn over system 200, it will be appreciated that suitable alternative belt turn over assemblies (not shown) are contemplated. For example, a suitable alternative belt turn over system (not shown) may employ directing members positioned horizontally on top of each other rather than in the vertical orientation shown in FIG. 5A, without departing from the disclosed concept. In another suitable example, a plurality (e.g., 5) of individual and relatively small bend pulleys might be removably coupled to each of the channel members 212,214, said bend pulleys being configured to receive the conveyor belt 104 therebetween in a non-static manner, and each be replaceable in a similar manner as the directing members 262,264. Moreover, in a suitable alternative belt turn over system, biasing elements such as springs could be associated with (e.g., engage or indirectly apply a bias thereto) the directing members 262,264 in order to automatically adjust the belt turn over system 200 to a varying pressure with respect to the conveyor belt 104. The biasing elements preferably allow a tension level of the conveyor belt 104 to be adjusted.

Accordingly, the above disclosed belt turn over system 200 can be understood as comprising first and second directing assemblies 201,202 (FIG. 5A), wherein the two directing assemblies 201,202 each respectively include the first and second channel members 212,214, the first and second pluralities of directing members 262,264, and associated coupling members. Furthermore, the first and second directing assemblies 201,202 can be understood as sharing the common top and bottom channel members 216,218 in order to be mounted within the conveyor system 102.

FIGS. 6-10 show another conveyor system 302 and belt turn over system 400 therefor, in accordance with another non-limiting embodiment of the disclosed concept. The conveyor system 302 is similar to the conveyor system 102 (FIG. 1B), and like numbers represent like features (e.g., conveyor belt 304, support members 310,312,314,316,318, 320, bend pulleys 330,332). However, the belt turn over system 400, which functions similar to the belt turn over system 200 (FIGS. 5A and 5B) has a pair of independently configured directing assemblies 401,402.

Figure 9A:
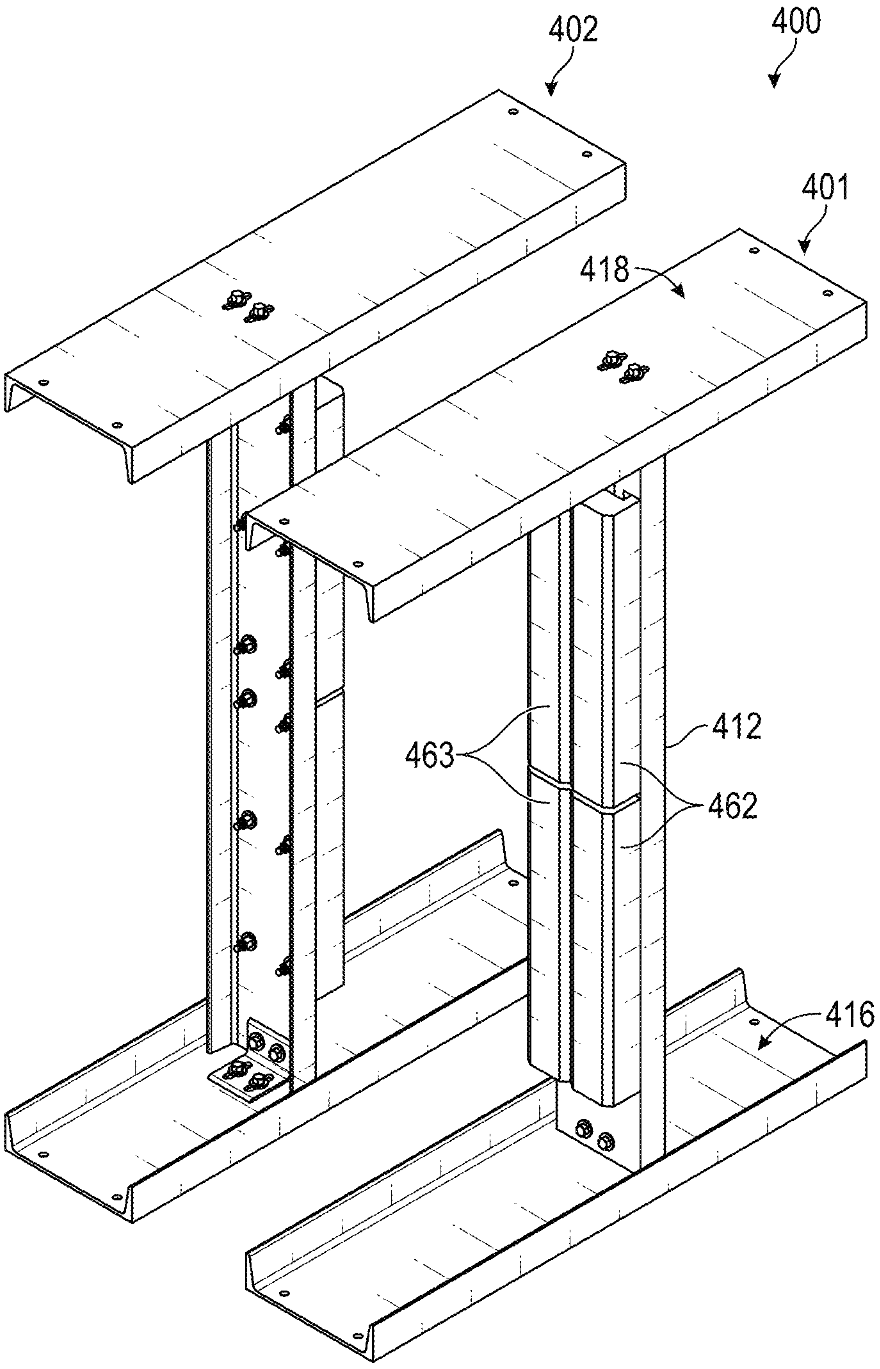
FIGS. 9A and 9B are front isometric and exploded front isometric views, respectively, of a belt turn over system for use in the conveyor system of FIGS. 6-8, in accordance with another non-limiting embodiment of the disclosed concept.
Figure 9B:
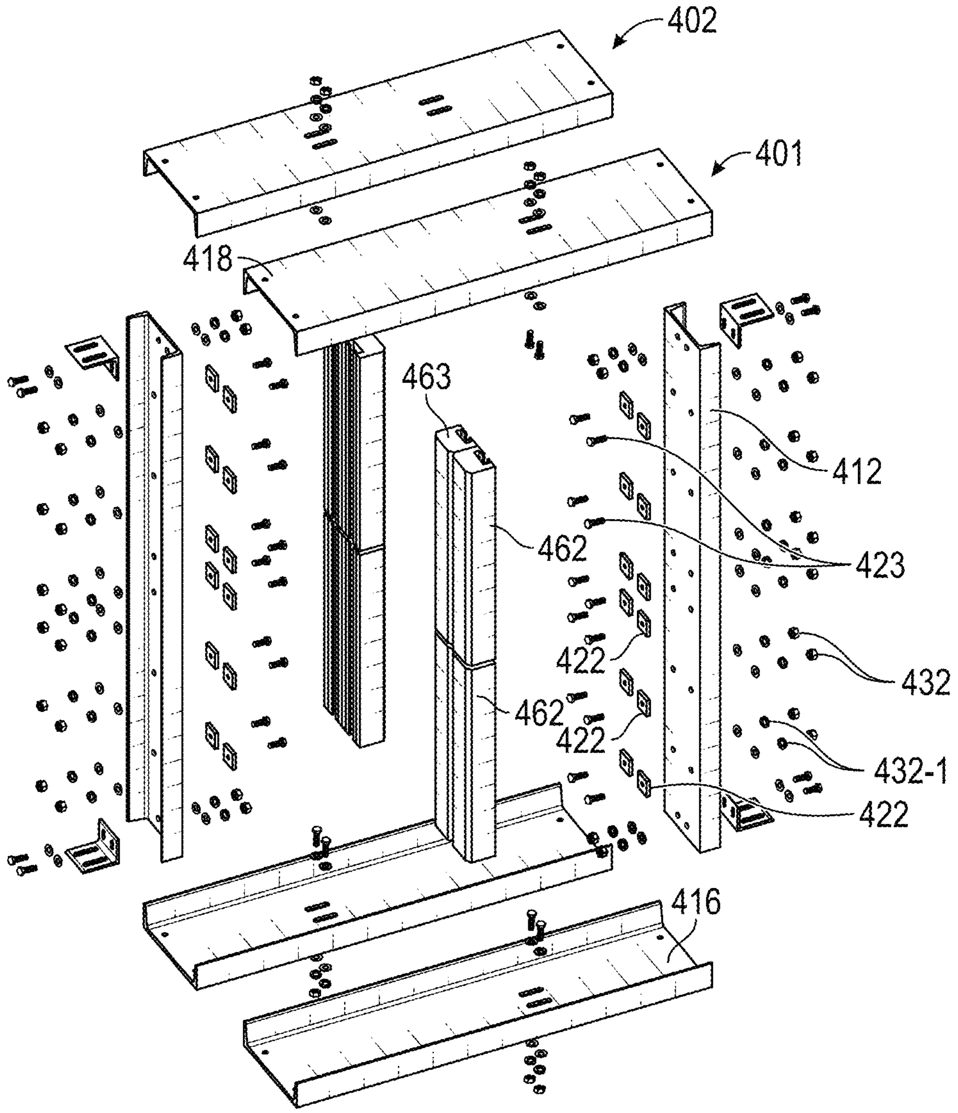

As shown in FIGS. 9A and 9B, the directing assembly 401 of the belt turn over system 400 preferably includes a first channel member 412 configured to be coupled to at least one of the support members 310,312,314,316,318,320 of the conveyor system 302, and second and third channel members 416,418 extending between and being coupled to top and bottom portions of the first channel member 412 (e.g., via top and bottom brackets and coupling members, shown in FIG. 9B, but not labeled for ease of illustration and economy of disclosure). Additionally, the directing assembly 401 also includes a first plurality of directing members 462 and a second plurality of directing members 463 arranged next to and parallel to one another.

In this manner, the second and third channel members 416,418 mount the first directing assembly 401 in the conveyor system 302 independently of the second directing assembly 402. Further, the second directing assembly 402 also has second and third channel members configured the same as the channel members 416,418, such that both directing assemblies 401,402 can be mounted at different locations from one another within the conveyor system 302. That is, if an operator desires, he or she can mount the first directing assembly 401 at a first location in the conveyor system 302 with respect to the second directing assembly 402, and also mount the first directing assembly 401 at a second, differently spaced apart location with respect to the second directing assembly 402. The conveyor system 400 is thus versatile, and allows users to modularly turn over the conveyor belt 304.

Figure 6:
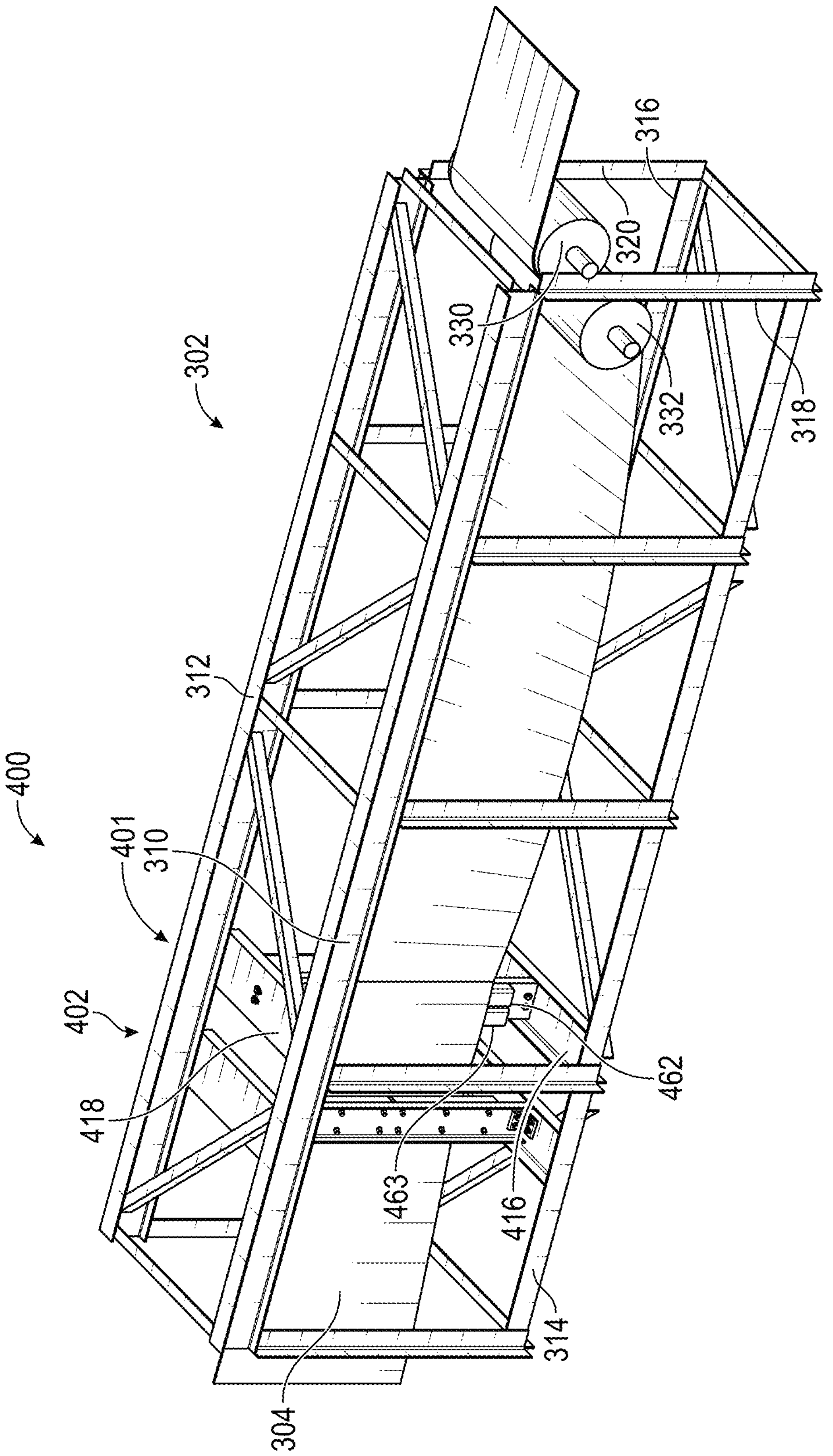
FIG. 6 is an isometric view of a portion of another conveyor system, in accordance with another non-limiting embodiment of the disclosed concept.
Figure 8:
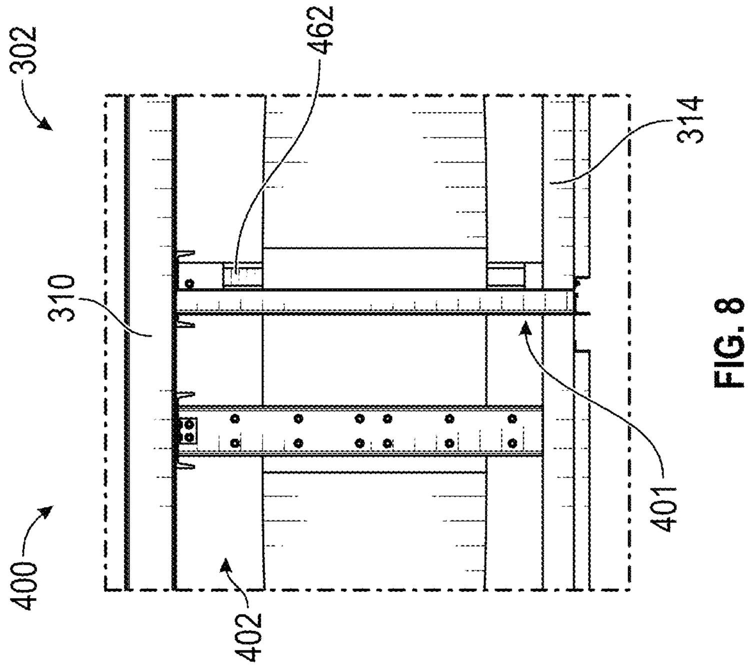
FIGS. 7 and 8 are top and side views, respectively, of portions of the conveyor system of FIG. 6.
Figure 7:
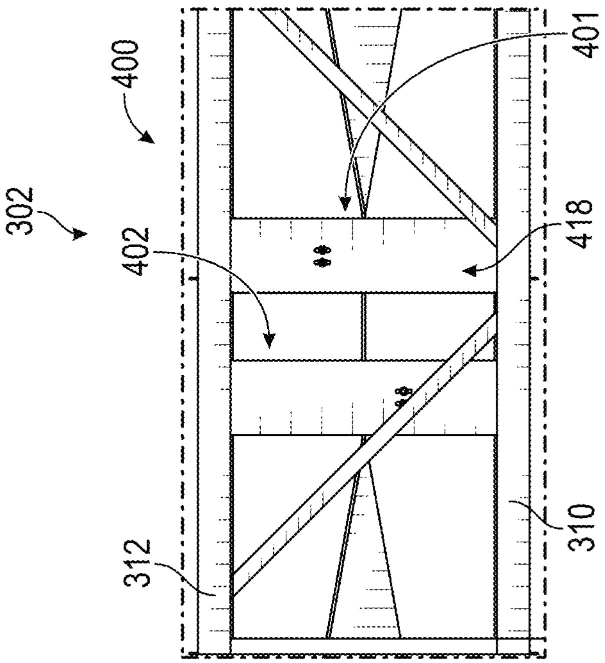

Moreover, the channel members 416,418, as well as the same channel members of the second directing assembly 402, are configured to be oriented perpendicular to the conveyor belt 304 when the conveyor belt 304 is received between the directing members 462,463 of the first directing assembly 401 and the directing members (shown but not labeled) of the second directing assembly 402. Further, as shown in FIG. 6, the top channel member 418 extends from the first support member 310 to the second support member 312, and the bottom channel member 416 extends from the third support member 314 to the fourth support member 316. The channel members of the second directing assembly 402 are similarly configured with respect to the support members 310,312,314,316.

Referring to FIG. 9B, the directing members 462,463 are removably coupled to the first channel member 412, like the directing members 262,264 (discussed above). As such, the directing members 462,463 are configured to be in a static state with respect to the first channel member 412 when the conveyor belt 304 moves from a first location to a second location of the conveyor system 302. Additionally, the directing members 462,463 are configured to engage the conveyor belt 304 as the conveyor belt 304 moves from the first location to the second location in order to turn over the conveyor belt 304.

However, unlike the first and second directing assemblies 201,202 of the belt turn over system 200 (FIGS. 5A and 5B), the first and second directing assemblies 401,402 are in a staggered relationship with respect to each other, as shown in FIG. 6, such that as the conveyor belt 304 moves from the first location to the second location, the conveyor belt 304 engages the directing members of one of the directing assemblies 401,402 before engaging the directing members of the other of the directing assemblies 401,402. In this manner, operators are able to have versatility in properly turning over the conveyor belt 304.

Regarding coupling, the directing members 462,463 and the directing members of the second directing assembly 402, are preferably coupled to the corresponding channel members 412 similar to the belt turn over system 200. Specifically, the directing assembly 401 preferably including a plurality of maintaining members 422 each configured to be received within the directing members 462,463, as well as coupling members (e.g., bolts) 423 which extend through the directing members 462,463 and the first channel member 412, as well as securing members (e.g., nuts and washers) 432,432-1 which are located on an opposing side of the first channel member 412 from the maintaining members 422, and which secure the directing members 462,463 to the first channel member 412 (e.g., via the coupling members 423).

Figure 10:
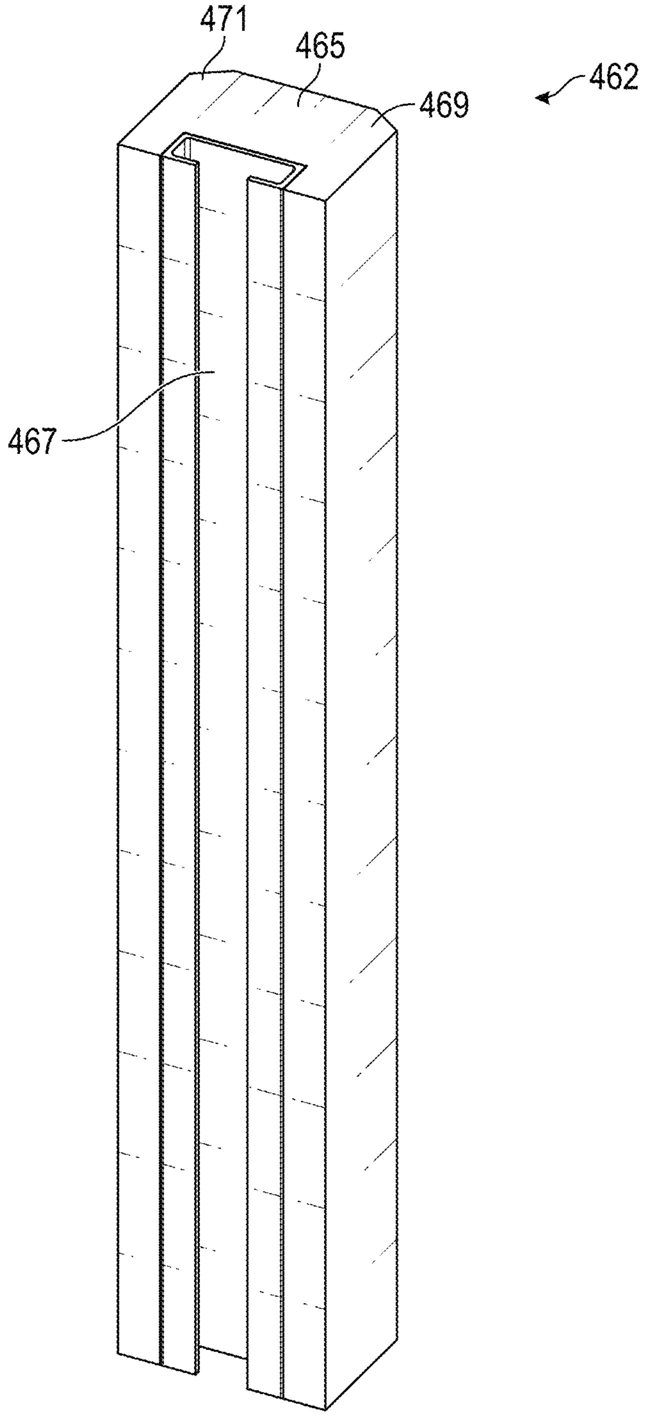
FIG. 10 is an isometric view of a directing member for the belt turn over system of FIGS. 9A and 9B.

FIG. 10 shows an isometric view of one of the directing members 462, which may be the same as any of the other directing members 262,264,463. As shown, the directing member 462 includes a body 465 and a receiving member 467 associated with (e.g., coupled to, provided as integral therewith (e.g., two portions of the same component)) the body 465. In one example, the maintaining members 422 are each received within the receiving member 467 in order to removably couple the directing members 462,463 to the first channel member 412. Continuing to refer to FIG. 10, the receiving member 467 is preferably C-shaped in order to prevent the maintaining members 422 from being pulled out of the directing members 462,463. Furthermore, the body 465 preferably has at least one bevel portion 469,471 at an end. The bevel portions 469,471 are configured to indicate a wear level of the directing member 462 responsive to engagement with the conveyor belt.

It will therefore be appreciated that a method of turning over the conveyor belts 104,304 include the steps of providing the conveyor systems 102,302 with the conveyor belts 104,304, the belt turn over systems 200,400, and the support members 110,112,114,116,118,120,310,312, 314, 316,318,320; providing the belt turn over systems 200,400 with the first and second directing assemblies 201,202,401, 402, moving the conveyor belts 104,304 from a first location of the conveyor systems 102,302 to a second location thereof; maintaining the directing members 262,264,462, 463 in a static state with respect to the first and second channel members 212,214,412 as the conveyor belts 104, 304 move from the first location to the second location; and receiving the conveyor belts 104,304 between the directing members 262,264,462,463 in order to turn over the conveyor belts 104,304 as the conveyor belts 104,304 move from the first location to the second location.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. A directing assembly of a belt turn over system for use in a conveyor system, the conveyor system comprising a conveyor belt and a plurality of support members, the conveyor belt configured to move from a first location of the conveyor system to a second location thereof, the directing assembly comprising:

a channel member structured to be coupled to at least one of the plurality of support members; and a plurality of directing members each removably coupled to the channel member and configured to be in a static state with respect to the channel member when the conveyor belt moves from the first location to the second location, wherein the plurality of directing members are configured to engage the conveyor belt as the conveyor belt moves from the first location to the second location in order to turn over the conveyor belt, the directing assembly further comprising a plurality of maintaining members, wherein each of the plurality of directing members comprises a body and a receiving member associated with the body, and wherein the plurality of maintaining members are each received within the receiving member of a corresponding one of the plurality of directing members in order to removably couple the plurality of directing members to the channel member.

2. The directing assembly according to claim 1, further comprising a plurality of securing members each securing the plurality of maintaining members to the first channel member, and wherein the plurality of maintaining members and the plurality of securing members are each disposed on opposing sides of the first channel member.

3. The directing assembly according to claim 2, wherein the channel member is a first channel member, wherein the directing assembly further comprises a second channel member and a third channel member, wherein the first channel member is coupled to and extends between each of the second and third channel members, and wherein the second and third channel members are each structured to be coupled to and extend between a top and bottom pair of the plurality of support members, respectively, in order to support the directing assembly in the conveyor system.

4. The directing assembly according to claim 2, wherein the plurality of directing members is a first plurality of directing members, wherein the directing assembly further comprises a second plurality of directing members each removably coupled to the channel member, and wherein the first plurality of directing members and the second plurality of directing members are oriented parallel to each other.

5. The directing assembly according to claim 2, wherein the receiving member is C-shaped in order to prevent the plurality of maintaining members from being pulled out of the plurality of directing members.

6. The directing assembly according to claim 2, wherein each corresponding body has at least one bevel portion at an end thereof, and wherein the at least one bevel portion is configured to indicate a wear level of the corresponding one of the plurality of directing members responsive to engagement with the conveyor belt.

7. A belt turn over system for a conveyor system, the conveyor system comprising a conveyor belt and a plurality of support members, the conveyor belt configured to move from a first location of the conveyor system to a second location thereof, the belt turn over system comprising:

- a first directing assembly, comprising:
  - a first channel member structured to be coupled to at least one of the plurality of support members, and
  - a first plurality of directing members each removably coupled to the first channel member and configured to be in a static state with respect to the first channel member when the conveyor belt moves from the first location to the second location; and
- a second directing assembly, comprising:
  - a second channel member structured to be coupled to the at least one of the plurality of support members, and
  - a second plurality of directing members each removably coupled to the second channel member and configured to be in a static state with respect to the first channel member when the conveyor belt moves from the first location to the second location,
- wherein the first plurality of directing members and the second plurality of directing members are configured to receive the conveyor belt therebetween and turn over the conveyor belt as the conveyor belt moves from the first location to the second location.

8. The belt turn over system according to claim 7, wherein the first directing assembly further comprises a third channel member and a fourth channel member, wherein the second directing assembly further comprises a fifth channel member and a sixth channel member, wherein the third and fourth channel members are each coupled to and oriented perpendicular with respect to the first channel member, wherein the fifth and sixth channel members are each coupled to and oriented perpendicular with respect to the second channel member, and wherein the third, fourth, fifth and sixth channel members are configured to be oriented perpendicular to the conveyor belt when the conveyor belt is received between the first plurality of directing members and the second plurality of directing members.

9. The belt turn over system according to claim 8, wherein the first and second directing assemblies are in a staggered relationship with respect to each other such that as the conveyor belt moves from the first location to the second location, the conveyor belt engages the first plurality of directing members before the second plurality of directing members.

10. The belt turn over system according to claim 8, wherein the first directing assembly comprises a first top bracket and a first bottom bracket, wherein the second directing assembly comprises a second top bracket and a second bottom bracket, wherein the first and second top brackets couple the third and fifth channel members to top portions of the first and second channel members, respectively, and wherein the first and second bottom brackets couple the fourth and sixth channel members to bottom portions of the first and second channel members, respectively.

11. The belt turn over system according to claim 7, wherein the first directing assembly further comprises a first plurality of maintaining members, wherein the second directing assembly further comprises a second plurality of maintaining members, wherein the first and second pluralities of maintaining members are each received within a corresponding one of the first and second plurality of directing members, wherein the first plurality of maintaining members and the second plurality of maintaining members are each configured to removably couple the corresponding one of the first and second plurality of directing members to the corresponding one of the first and second channel members.

12. The belt turn over system according to claim 11, wherein each of the first plurality of directing members and the second plurality of directing members comprises a body and a receiving member associated with the body, and wherein the first plurality of maintaining members and the second plurality of maintaining members are each received within the receiving member of a corresponding one of the first plurality of directing members and the second plurality of directing members.

13. The belt turn over system according to claim 12, wherein the first directing assembly further comprises a third plurality of maintaining members, wherein the second directing assembly further comprises a fourth plurality of maintaining members, wherein the third plurality of maintaining members and the fourth plurality of maintaining members are each received within the receiving members of the corresponding one of the first plurality of directing members and the second plurality of directing members in order to removably couple the first plurality of directing members and the second plurality of directing members to the corresponding first and second channel members.

14. A conveyor system, comprising:

- a conveyor belt configured to move from a first location of the conveyor system to a second location thereof;
- a plurality of support members; and
- a belt turn over system comprising:
  - a first directing assembly, comprising:
    - a first channel member coupled to at least one of the plurality of support members, and
    - a first plurality of directing members each removably coupled to the first channel member and configured to be in a static state with respect to the first channel member when the conveyor belt moves from the first location to the second location; and
  - a second directing assembly, comprising:
    - a second channel member coupled to the at least one of the plurality of support members, and
    - a second plurality of directing members each removably coupled to the second channel member and configured to be in a static state with respect to the first channel member when the conveyor belt moves from the first location to the second location,
- wherein the first plurality of directing members and the second plurality of directing members are configured to receive the conveyor belt therebetween and turn over the conveyor belt as the conveyor belt moves from the first location to the second location.

15. The conveyor system according to claim 14, wherein the plurality of support members comprises a first support member, a second support member, a third support member, and a fourth support member, wherein the first directing assembly further comprises a third channel member and a fourth channel member, wherein the second directing assembly further comprises a fifth channel member and a sixth channel member, wherein the third and fourth channel members are each coupled to the first channel member, wherein the fifth and sixth channel members are each coupled to the second channel member, wherein the third, fourth, fifth and sixth channel members are configured to be oriented perpendicular to the conveyor belt when the conveyor belt is received between the first plurality of directing members and the second plurality of directing members, wherein the third and fifth channel members extend from the first support member to the second support member, and wherein the fourth and sixth channel members extend from the third support member to the fourth support member.

16. The conveyor system according to claim 15, wherein the first and second directing assemblies are in a staggered relationship with respect to each other such that as the conveyor belt moves from the first location to the second location, the conveyor belt engages the first plurality of directing members before the second plurality of directing members.

17. The conveyor system according to claim 14, further comprising a pair of bend pulleys, wherein the plurality of support members comprises a first support member, a second support member, a third support member, a fourth support member, a fifth support member and a sixth support member, wherein each of the fifth and sixth support members is oriented perpendicular to each of the first, second, third, and fourth support members, and wherein the pair of bend pulleys are each coupled to the fifth and sixth support members in order to direct the conveyor belt after the conveyor belt has been turned over by the belt turn over system.

18. The conveyor system according to claim 17, wherein, when the conveyor belt is disposed between the first plurality of directing members and the second plurality of directing members, the conveyor belt is in a first orientation, and wherein, when the conveyor belt is in an exiting position with respect to the pair of bend pulleys, the conveyor belt is in a second orientation perpendicular to the first orientation.

19. A method of turning over a conveyor belt, comprising:

providing a conveyor system with the conveyor belt, a belt turn over system, and a plurality of support members;

providing the belt turn over system with a first directing assembly and a second directing assembly, the first directing assembly comprising a first channel member coupled to at least one of the plurality of support members, and a first plurality of directing members each removably coupled to the first channel member, the second directing assembly comprising a second channel member coupled to the at least one of the plurality of support members, and a second plurality of directing members each removably coupled to the second channel member;

moving the conveyor belt from a first location of the conveyor system to a second location thereof;

maintaining the first plurality of directing members and the second plurality of directing members in a static state with respect to the first and second channel members as the conveyor belt moves from the first location to the second location; and receiving the conveyor belt between the first plurality of directing members and the second plurality of directing members in order to turn over the conveyor belt as the conveyor belt moves from the first location to the second location.

* * * * *